INVENTOR
WALTER C. LANNING
BY [signature]
ATTORNEY

INVENTOR
WALTER C. LANNING
BY
[signature]
ATTORNEY

INVENTOR
WALTER C. LANNING
BY R. V. Craddock
ATTORNEY

United States Patent Office 2,805,020
Patented Sept. 3, 1957

2,805,020

BINARY ARITHMETIC COMPUTER CIRCUIT

Walter C. Lanning, Plainview, N. Y., assignor to Sperry Rand Corporation, a corporation of Delaware Application September 6, 1955, Serial No. 532,515
2 Claims. (Cl. 235—61)

This invention relates to circuits for binary digital computers, and more particularly to circuits for arithmetically operating on a pair of binary digital numbers in order to yield a binary digital number which differs from one number of the pair by the other number of the pair.

In the operation of addition or subtraction on two binary digital numbers in the series mode, the two numbers are considered digit by digit beginning with the least significant digits and a separate operation of addition or subtraction is performed on each pair of corresponding digits in order to yield a resulting number which differs from one of the two numbers by the other of the two numbers. While performing the operation of addition on the *n*th corresponding digits of the two numbers, the carry term from the addition operation of the $(n-1)$th corresponding digits must be included to obtain the correct result, whereas while performing the operation of subtraction on the *n*th corresponding digits of the two numbers, the borrow term from the subtraction operation of the $(n-1)$th corresponding digits must be included.

A binary digital number may be represented by a temporal train of discrete intelligence elements, wherein each unity digit in the number is denoted by a first type signal and each zero digit by a second type signal in the intelligence element corresponding to that digit. For example, the presence of an electrical pulse may be utilized to designate the number 1 and the absence of a pulse to designate the number 0. In order to perform the previously mentioned arithmetic operation on two binary digital numbers, a circuit must properly combine corresponding signals of the two signal trains representing the numbers. Furthermore, the circuit must include in the operation the transfer term from the immediately preceding digit operation; that is, the carry term for addition and the borrow term for subtraction. The output from the circuit must be the desired train of signals representing in binary digital form a number which differs from the first number by the second number. In the case of addition, the circuit must also provide a train of signals representing the carry term of the two numbers being added, and in the case of subtraction the circuit must also provide a train of signals representing the borrow term of the two numbers being subtracted. The circuit must also provide means for storing this transfer term and releasing it for use in the next succeeding operation on corresponding digits in the signal trains.

It is therefore an object of this invention to provide an electrical computing circuit for performing an arithmetic operation on a pair of binary digital numbers to yield a binary digital number differing from one number of the pair by the other number of the pair.

It is a further object of this invention to provide an electrical computing circuit employing a common channel for generating the sum and difference terms of two binary digital numbers.

It is a further object of this invention to provide an improved electrical computing circuit for selectively performing the operations of addition and subtraction on two binary digital numbers.

It is a further object of this invention to provide an improved electrical computing circuit employing a plurality of common circuit elements for generating the sum, the carry and the borrow terms in arithmetic operations on two binary digital numbers.

In this invention, a pair of binary digital numbers represented by temporal trains of discrete signal elements corresponding to successive digits in said numbers are coupled into a sum circuit. Also coupled into the sum circuit is the transfer digit from the arithmetic operation on the immediately preceding corresponding digits of the pair of numbers. The sum circuit is adapted to produce an output signal representing unity when an odd number of its three input signals represent unity. The output signal train of this sum circuit represents the number which differs from one of the two input numbers by the second input number. A transfer digit generator circuit is also adapted to receive the pair of numbers and the transfer term and to produce a first output signal representing unity when any two of its three input signals represent unity and a second output signal representing unity when the digit of one of said pair of numbers is less than the sum of corresponding digits of the other of said pair of numbers and the preceding transfer term. These two output signals of the transfer digit generator circuit, which respectively represent the carry term and the borrow term are selectively applied to a storage circuit where the transfer digits are stored and appear as output signals at a later time that coincides with the occurrence of the next following signal element. Not only does the circuit of this invention use common elements for generating the sum and difference terms, but furthermore by an adroit interconnection of the logical elements performing the necessary functions of this computer, many circuit elements are eliminated or used in combination by the sum, carry and borrow channels.

Other objects and advantages of the present invention will become apparent from the specification taken in connection with the accompanying drawings wherein.

Figure 1:
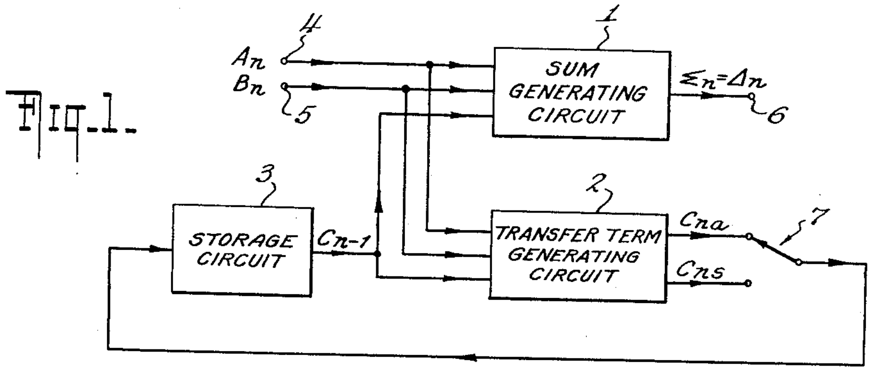
Fig. 1 is a block diagram of the arithmetic computer circuit of this invention.

In the following description and claims certain of the mathematical operations which are peculiarly applicable to binary digital computation may be defined as follows:

Conjunction—yields a 1 out if both inputs are 1

| | | B 0 | B 1 |
|---|---|---|---|
| A | 0 | 0 | 0 |
| A | 1 | 0 | 1 |

This operation is performed by a Conjunctive logical element.

Disjunction—yields a 1 out if the inputs are unlike or both 0's.

| | | B 0 | B 1 |
|---|---|---|---|
| A | 0 | 1 | 1 |
| A | 1 | 1 | 0 |

This operation is performed by a Disjunctive logical element.

Inclusive-Or—yields a 1 out if any of the inputs are 1

| | | B 0 | B 1 |
|---|---|---|---|
| A | 0 | 0 | 1 |
| A | 1 | 1 | 1 |

This operation is performed by an Inclusive-Or logical element.

Equivalence—yields a 1 out if the inputs are alike.

| | | B 0 | B 1 |
|---|---|---|---|
| A | 0 | 1 | 0 |
| A | 1 | 0 | 1 |

This operation is performed by an Equivalence logical element.

Exclusive-Or—yields a 1 out if the inputs are unlike.

| | | B 0 | B 1 |
|---|---|---|---|
| A | 0 | 0 | 1 |
| A | 1 | 1 | 0 |

This operation is performed by an Exclusive-Or logical element.

Not—yields the opposite digit or number of the digit input. Whereas the aforementioned logical elements perform a mathematical operation in combining two binary digital numbers, the Not logical element operates on a single binary digital number. Thus, if the input to a Not logical element is 1, the output is 0 and vice versa.

To arithmetically operate on a pair of binary digital numbers in order to yield a binary digital number which differs from one number of the pair by the other number of the pair, the numbers must be considered digit by digit beginning with the least significant digit and the proper operation performed on each pair of corresponding digits. In the addition of the $n$th corresponding digits of the two numbers the carry term from the addition operation of the $(n-1)$th corresponding digits is included in order to obtain the correct result, whereas in the subtraction of the $n$th corresponding digits of the two numbers the borrow term from the subtraction operation of the $(n-1)$th corresponding digits is included in order to obtain the correct result. Thus, the operations of addition and subtraction on two binary digital numbers in the series mode must conform to the following truth table:

| $A_n$ | $B_n$ | $C_{n-1}$ | $\Sigma_n=\Delta_n$ | $C_{na}$ | $C_{ns}$ |
|---|---|---|---|---|---|
| 0 | 0 | 0 | 0 | 0 | 0 |
| 1 | 0 | 0 | 1 | 0 | 0 |
| 0 | 1 | 0 | 1 | 0 | 1 |
| 1 | 1 | 0 | 0 | 1 | 0 |
| 0 | 0 | 1 | 1 | 0 | 1 |
| 1 | 0 | 1 | 0 | 1 | 0 |
| 0 | 1 | 1 | 0 | 1 | 1 |
| 1 | 1 | 1 | 1 | 1 | 1 |

In this table $A_n$ and $B_n$ represent $n$th corresponding digits of the pair of numbers on which the arithmetic operation is to be performed. In the case of subtraction, $A_n$ represents the minuend and $B_n$ the subtrahend. The term $C_{n-1}$ represents the transfer term from the preceding arithmetic operation performed on the $(n-1)$th corresponding digits of the number pair. The sum term is represented by $\Sigma_n$ and the difference term by $\Delta_n$, these terms being alike for like transfer terms in binary digital arithmetic. The carry term for addition is represented by $C_{na}$ and the borrow term for subtraction by $C_{ns}$. These two transfer terms having a subscript $n$ are used in arithmetically operating on the $(n+1)$th corresponding digits.

In order to construct a computer which will perform the operations demanded by the truth table and which will thereby yield a binary digital number $\Sigma_n$ or $\Delta_n$ which differs from one of a pair of input numbers $A_n$, $B_n$ by the other number of the pair, equations representing the operations in the table must be formulated. Boolean algebra, a branch of mathematics well suited to express mathematical relationships in a binary number system, will be employed here. An equation formulating the conditions under which the desired binary digital number $\Sigma_n$, $B_n$ is unity, as shown in the truth table, is as follows:

$$\Sigma_n=\Delta_n=A_nB_n'C_{n-1}'+A_n'B_nC_{n-1}'+A_n'B_n'C_{n-1}+A_nB_nC_{n-1} \quad (1)$$

In this notation, the primed symbols indicate the Not of the unprimed symbols. Thus, the first term in the polynomial yields a 1 if $A_n$ is 1 and $B_n$ is not 1 and $C_n$ is not 1. If any of the four terms in the polynomial are 1, $\Sigma_n=\Delta_n$ is 1. Equation 1 may be reduced and simplified according to the following steps, $$\Sigma_n=\Delta_n=C_{n-1}'(A_nB_n'+A_n'B_n)+C_{n-1}(A_n'B_n'+A_nB_n) \quad (2)$$

$$\Sigma_n=\Delta_n=C_{n-1}'(A_n'B_n'+A_nB_n)'+C_{n-1}(A_n'B_n'+A_nB_n) \quad (3)$$

The term within the parentheses yields a 1 if $A_n$, $B_n$ are both 1 or both 0; therefore the term within the parentheses represents an Equivalence operation on the numbers $A_n$, $B_n$. Consequently, letting, $$X_n=A_n'B_n'+A_nB_n \quad (4)$$

the following expression is obtained, $$\Sigma_n=\Delta_n=C_{n-1}'X_n'+C_{n-1}X_n \quad (5)$$

in which the term $X_n$ represents an Equivalency operation on the numbers $A_n$, $B_n$.

In a similar manner, an expression for the term $C_{na}$ may be formulated from the truth table according to the following equation, $$C_{na}=A_nB_nC_{n-1}'+A_nB_n'C_{n-1}+A_n'B_nC_{n-1}+A_nB_nC_{n-1} \quad (6)$$

This equation may be further reduced, $$C_{na}=C_{n-1}(A_n'B_n+A_nB_n')+A_nB_n(C_{n-1}+C_{n-1}') \quad (7)$$

$$C_{na}=C_{n-1}(A_n'B_n'+A_nB_n)'+A_nB_n \quad (8)$$

Once more substituting the term $X_n$ for the Equivalence operation on the numbers $A_n$, $B_n$ there results, $$C_{na}=C_{n-1}X_n'+A_nB_n \quad (9)$$

Equation 9 is not in its simplest form. It can be reduced to, $$C_{na}=A_nB_n+A_nC_{n-1}+B_nC_{n-1} \quad (10)$$

However, Equation 9 is more useful than Equation 10, since it is written as a function of $X_n$.

An expression for the term $C_{ns}$ may be formulated from the truth table according to the following equation, $$C_{ns}=A_n'B_nC_{n-1}'+A_n'B_n'C_{n-1}+A_n'B_nC_{n-1}+A_nB_nC_{n-1} \quad (11)$$

This equation may be further reduced, $$C_{ns}=C_{n-1}(A_n'B_n'+A_n'B_n)+A_n'B_n(C_{n-1}+C_{n-1}') \quad (12)$$

$$C_{ns}=C_{n-1}(A_n'B_n'+A_nB_n)+A_n'B_n \quad (13)$$

Once more substituting the term $X_n$ for the Equivalence operation on the numbers $A_n$ and $B_n$, there results, $$C_{ns}=C_{n-1}X_n+A_n'B_n \quad (14)$$

Equation 14 is not in its simplest form. It can be reduced to, $$C_{ns}=A_n'B_n+A_n'C_{n-1}+B_nC_{n-1} \quad (15)$$

However Equation 14 is more useful than Equation 15 since it is written as a function of $X_n$.

The computer of this invention performs the operation of addition or subtraction on two binary digital members in a series mode by making maximum effective use of the logical elements it employs. Thus, by generating the sum, carry and borrow terms according to Equations 5, 9 and 14, many logical elements may be employed in common for generating two or three of these terms. Hence, to obtain the sum and difference terms $\Sigma_n$ and $\Delta_n$, it is first necessary to generate the Equivalence term $X_n$ and the Exclusive-Or term $X_n'$ from the two corresponding input digits $A_n$, $B_n$. An Equivalence operation is then performed on the Equivalence term $X_n$ and on the previous transfer term $C_{n-1}$, the operation yielding the term $\Sigma_n=\Delta_n$, as shown in Equation 5. Equation 9 indicates that the addition transfer term (carry term) may be generated by performing a Conjunctive operation on the previous transfer term $C_{n-1}$ and the Exclusive-Or term $X_n'$, by performing a Conjunctive operation on $A_n$ and $B_n$, and then by performing an Inclusive-Or operation on the terms resulting from these two Conjunctive operations. Equation 14 indicates that the subtraction transfer term (borrow term) may be generated by performing a Conjunctive operation on the previous transfer term $C_{n-1}$ and the Equivalence term $X_n$, by performing a Conjunctive operation on $A_n'$ and $B_n$, and then by performing an Inclusive-Or operation on the terms resulting from these two Conjunctive operations.

Considering now Fig. 1, there are shown in block diagram form a sum generating circuit 1, which produces an output signal representing unity when an odd number of its three input digit signals represent unity, a transfer term generating circuit 2, which produces a first output signal representing unity when any two of its three input signals represent unity, and a second output signal representing unity when a digit of one of its three input signals is less than the sum of corresponding digits of the other two of its three input signals, and a storage circuit 3 which stores the transfer digits and supplies them as output signals at a later time that coincides with the occurrence of the next following signal elements. Coupled into circuit 1 from terminals 4 and 5 are the two binary digital numbers A, B on which the desired arithmetic operations are to be performed, and from the output terminal of the storage circuit 3 the transfer digit from the immediately preceding digit operation. The output of the sum generating circuit 1 is supplied to terminal 6, and corresponds with the fourth column of the truth table, thereby representing $\Sigma_n$ or $\Delta_n$, depending on whether the operation of addition or subtraction is being performed. The same three signals which are coupled into circuit 1 are also coupled into the transfer term generating circuit 2. The two output signals of circuit 2 are supplied to the two contacts of a selector switch such as the single-pole, double-throw switch 7, the first of these output signals corresponding with the fifth column of the truth table and being designated $C_{na}$, the transfer term for addition, and the second of these output signals corresponding with the sixth column of the truth table and being designated $C_{ns}$, the transfer term for subtraction. When switch 7 is in its upper position the arithmetic circuit performs an operation of addition on the pair of numbers A, B. When the switch is in its lower position the arithmetic circuit performs an operation of subtraction on the pair of numbers A, B.

Sum generating circuit 1 of Fig. 1 produces an output signal in accordance with Equation 5. The addition transfer term and subtraction transfer term output signals of transfer term generating circuit 2 are produced in accordance with respective Equations 9 and 14. A sum term generating circuit and a transfer term generating circuit may be assembled to operate according to their design equations by an interconnection of computer elements such as gating circuits using electron discharge devices, mechanical gating circuits, or magnetic logical elements.

Figure 2:
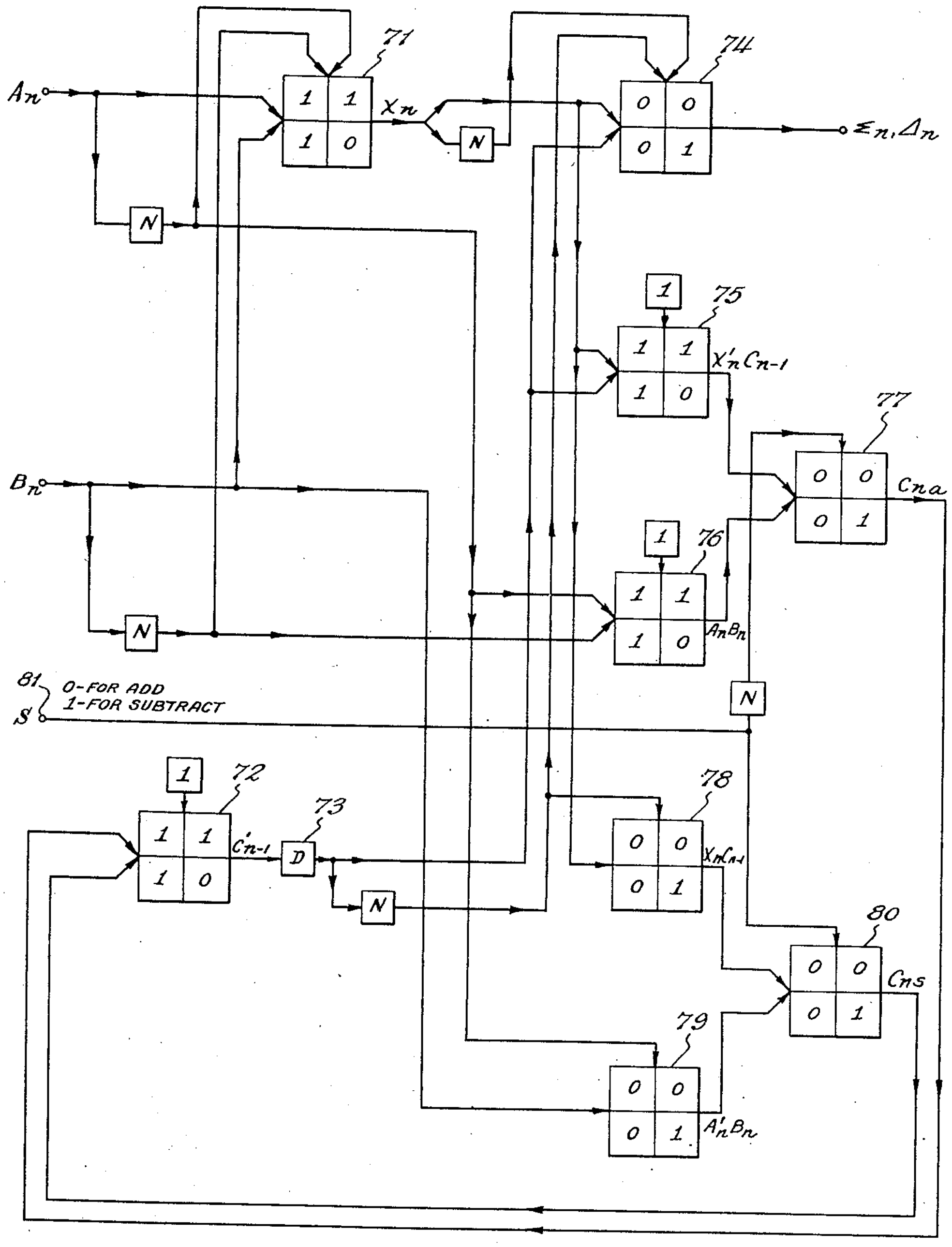
Fig. 2 is a diagram useful in explaining the theory of operation of this invention.

These computer elements must be assembled in accordance with binary logical principles in order to perform their desired circuit functions. A system of binary logic by which the computer elements may be interconnected is shown in Fig. 2. In this figure matrices representing logical functions defined in the earlier table of definitions are shown interconnected by lines which represent the direction and order of transference of numbers through the system. The blocks containing the symbol N represent the Not logical function. The lines terminating at the left side of the matrices represent digit inputs to the matrix rows, the top row representing 0 and the bottom row 1, whereas the lines terminating at the top of the matrices represent digit inputs to the matrix columns, the left column representing 0 and the right column 1. Thus the input to a matrix 71, which represents the logical function of Disjunction, is shown to be $A_n+B_n$ to the rows and $A_n'+B_n'$ to the columns. The output of matrix 71, shown by the line from the right side of the matrix, is given by a Disjunctive operation on its inputs, or $$[(A_n+B_n)(A_n'+B_n')]'=A_n'B_n'+A_nB_n=X_n \quad (16)$$

Thus from Equation 4 the output of matrix 71 is the Equivalence operation, $X_n$, on the numbers $A_n$, $B_n$.

A matrix 72 receives the transfer digit from the immediately preceding digit operation and applies it to a delay element 73. The delay element 73 releases this immediately preceding transfer digit for operation on simultaneous digits of the two input numbers. A matrix 74 receives the Equivalence term, $X_n$, and the Not of the transfer digit term, $C_{n-1}'$, as an input to its rows and the Not of the Equivalence term, $X_n'$, and the transfer digit term $C_{n-1}$ as an input to its columns. Thus the output of matrix 74, which represent a Conjunctive logical function, is $$(X_n+C_{n-1}')\ (X_n'+C_{n-1})=X_nC_{n-1}+X_n'C_{n-1}'=\Sigma_n=\Delta_n \quad (17)$$

which is shown by Equation 5 to be the desired sum term and difference term.

Applied to the rows of a matrix 75 are the Not of the carry term, $C_{n-1}'$, and the Equivalence term, $X_n$. Applied to the columns of matrix 75 is a constant series of unity digits, denoted by a block containing a 1. Since matrix 75 represents the function of Disjunction its output is $$[(X_n+C_{n-1}')1]'=X_n'C_{n-1}+0=X_n'C_{n-1} \quad (18)$$

Applied to the rows of a matrix 76 are $A_n'$ and $B_n'$. Applied to the columns of matrix 76 is a constant series of unity digits. Since matrix 76 performs the function of Disjunction its output is $$[(A_n'+B_n')1]'=A_nB_n+0=A_nB_n \quad (19)$$

The outputs of matrices 75 and 76 are applied to the rows of a matrix 77. This combination is given by Equation 9 and represents the transfer term for addition, $C_{na}$. If the input to the columns of matrix 77, which is a Conjunctive matrix, is unity the output will be $C_{na}$.

The input to the rows of a matrix 78 is the Equivalence term, $X_n$. The input to the columns of matrix 78 is the transfer term, $C_{n-1}$. The output of matrix 78, which represents a Conjunctive operation, is $$X_nC_{n-1} \quad (20)$$

The input to the rows of a matrix 79 is $B_n$. The input to the columns of matrix 79 is $A_n'$. The output of matrix 79, which represents the operation of conjunction, is $$A_n'B_n \quad (21)$$

The outputs of matrixes 78 and 79 are applied to the rows of a matrix 80 and represents the transfer term for subtraction, $C_{ns}$, as shown in Equation 14. If the input to the columns of matrix 80, which is a conjunctive matrix, is unity the output will be $C_{ns}$.

The outputs of matrices 77 and 80 are applied to the rows of matrix 72. The input to the columns of matrix 72 is a constant series of unity digits. Since matrix 72 is of the Disjunctive type its output represents the Not of the applied transfer term.

In order to select either the operation of addition or subtraction a switching 1 is applied to the columns of one of the matrix pair 77 and 80 and a 0 to the columns of the other of the matrix pair. The switching signal is applied at terminal 81. Thus, with no input to terminal 81 a 0 is applied to matrix 80 and a 1 to matrix 77, so that the output of matrix 77 is $C_{na}$ and the output of matrix 80 is 0, and the system will perform the operation of addition. On the other hand applying a 1 to terminal 81 will apply a 1 to matrix 80 and a 0 to matrix 77, causing the circuit to perform the operation of subtraction.

Figure 3:
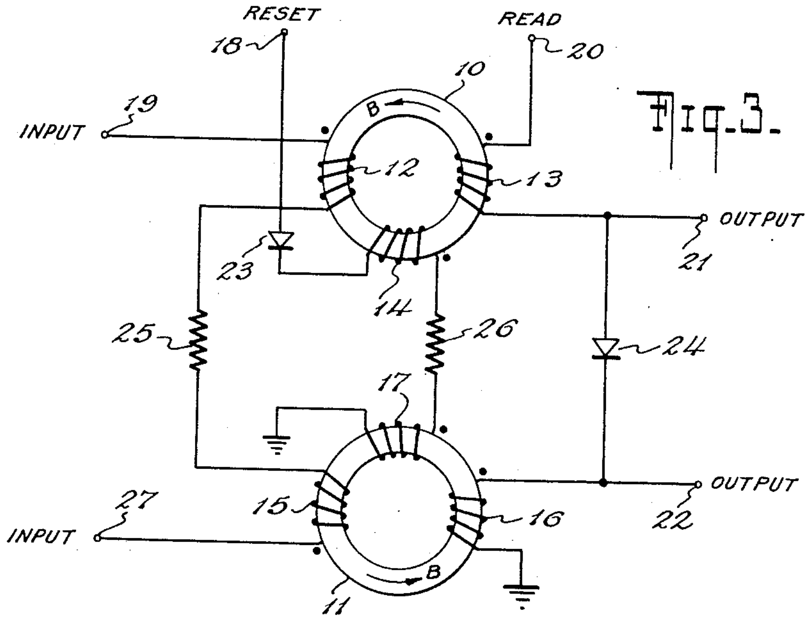
Fig. 3 is a schematic diagram of a circuit element suitable for use in this invention.

A particular circuit element which is suitable for use in a binary digital computing circuit and which facilitates assemblage of the instant arithmetic circuit according to the principles described, is shown in Fig. 3. For purposes of simplicity, this circuit element will henceforth be termed a functor. The functor comprises a pair of toroidal magnetic cores 10 and 11, on each core there being wound an input, an output, and a reset winding. Input winding 12, output winding 13, and reset winding 14 are wound on core 10. Input winding 15, output winding 16, and reset winding 17 are wound on core 11. The magnetization effect of each winding on its core is indicated by the presence of a dot near one end or terminal of the winding. Positive current entering the dotted terminal of any winding tends to set up magnetic flux in the core in the arbitrarily assigned positive direction, as shown by the arrows.

Figure 4:
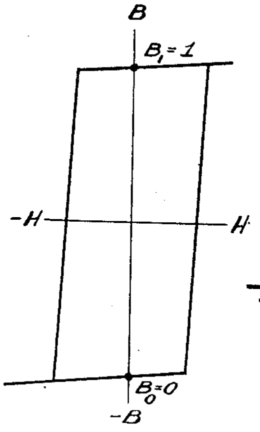
Fig. 4 is a graph illustrating the hysteresis loop of a magnetic material used in the element of Fig. 3.

An idealized hysteresis loop of the cores of the functor is shown in Fig. 4. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magnetized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

Figure 5:
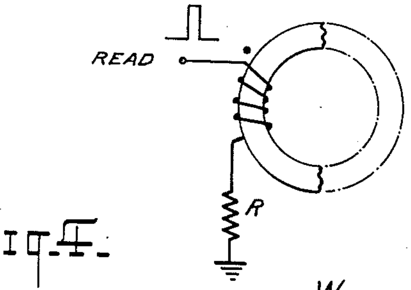
Fig. 5 is a circuit used to illustrate the operation of the element of Fig. 3.

To illustrate how pulses are read out of the functor, the exemplary circuit of Fig. 5 is used. In this circuit a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil tends to cause no change of remanence state. Consequently, there will be but little voltage induced in the winding, and it acts as a low impedance, so that most of the voltage applied to the read terminal will appear across the resistor.

The appearance of a pulse across the resistor of Fig. 5 occurs when the core is in a unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the present of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 18 and read terminal 20 are connected directly to different terminals of the clock source. The input terminal 19 is connected to another terminal of the clock source either directly or through intermediate circuitry which may or may not permit passage of the particular clock pulse to the input terminal 19. It is necessary that the terminals of the clock source be so selected that the cyclical order of pulses energizing the functor windings follow the pattern of reset, input, and read.

The clock pulses applied to reset terminal 18 enter reset winding 14 at its undotted end and reset winding 17 at its dotted end, thereby setting core 10 to 0 and core 11 to 1. A positive pulse applied to input terminal 19 enters input winding 12 at its dotted end and input winding 15 at its undotted end. If no input pulse reaches input terminal 19 during a particular clock cycle, the cores remain in their reset state. However, if a pulse enters input terminal 19, core 10 is set to 1 and core 11 is set to 0.

A pulse applied to the read terminal 20 enters winding 13 at its dotted end. Output terminal 21 acts only as a current source, or generator of electric current pulses. If core 10 is set to 0, the output winding 13 acts as a high impedance and little current can flow from output terminal 21. Thus, the output signal from output terminal 21, will be a 0 in accordance with the principles explained in connection with Fig. 5. If core 10 is set to 1, the output winding 13 acts as a low impedance and an output pulse, representing the number 1, will appear at output terminal 21.

Output terminal 22, which acts only as a current sink, or receiver of electric current pulses, is connected through intermediate circuitry to the same terminal of the clock source as read terminal 20. With core 11 set to 0, output winding 16 acts as a high impedance and prevents current flow in the intermediate circuitry. Thus, the signal from the terminal 22 may be said to be a 0. If core 11 is set to 1, output winding 16 acts as a low impedance and permits current to flow in the intermediate circuit connected to terminal 22 and to enter winding 16 and flow to ground therethrough. Thus, the signal from terminal 22 may be said to be a 1.

Summarizing the above analysis, if the input signal to the functor is 1, the output signal of terminal 21 is 1, and the output signal of terminal 22 is 0. On the other hand, if the input signal is 0, the output signal from terminal 21 is 0, and the output signal from terminal 22 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 3, the functor will perform in an opposite manner. In this case, an input 1 will yield an output of 0 at terminal 21 and an output of 1 at terminal 22. Again expressing its operation electrically, if the input is 1, the functor will not deliver an output pulse at one output terminal, but will allow reception of a pulse at the other output terminal. Such a functor is designated as a functor one.

In its use in a computing circuit a functor is interconnected with other functors. Thus, in the functor of Fig. 3, the input terminal 19 is connected to a current source output terminal of a preceding functor. The input terminal 27 is connected to a current sink output terminal of a preceding functor. Similarly, output terminals 21 and 22 are connected to input terminals of succeeding functors. Thus, input windings 12 and 15 are in series with each other and in series with a preceding current source output terminal and a preceding current sink output terminal. Only if both the preceding current source and the preceding current sink generate an output signal of 1 does a current pulse flow in the input windings 12 and 15. If either or both of the preceding functors generates an output signal of 0, a 0 signal will be applied to the input windings 12 and 15. Thus, the functor zero of Fig. 3 yields a 1 at its current source terminal output 21 only if both inputs are 1, and therefore, acts basically as a Conjunctive logical element.

In similar manner, the functor one yields a 1 at its current source output terminal if the inputs are either 1–0 or 0–1, or both 0, and, therefore, acts basically as a Disjunctive logical element.

Figure 6:
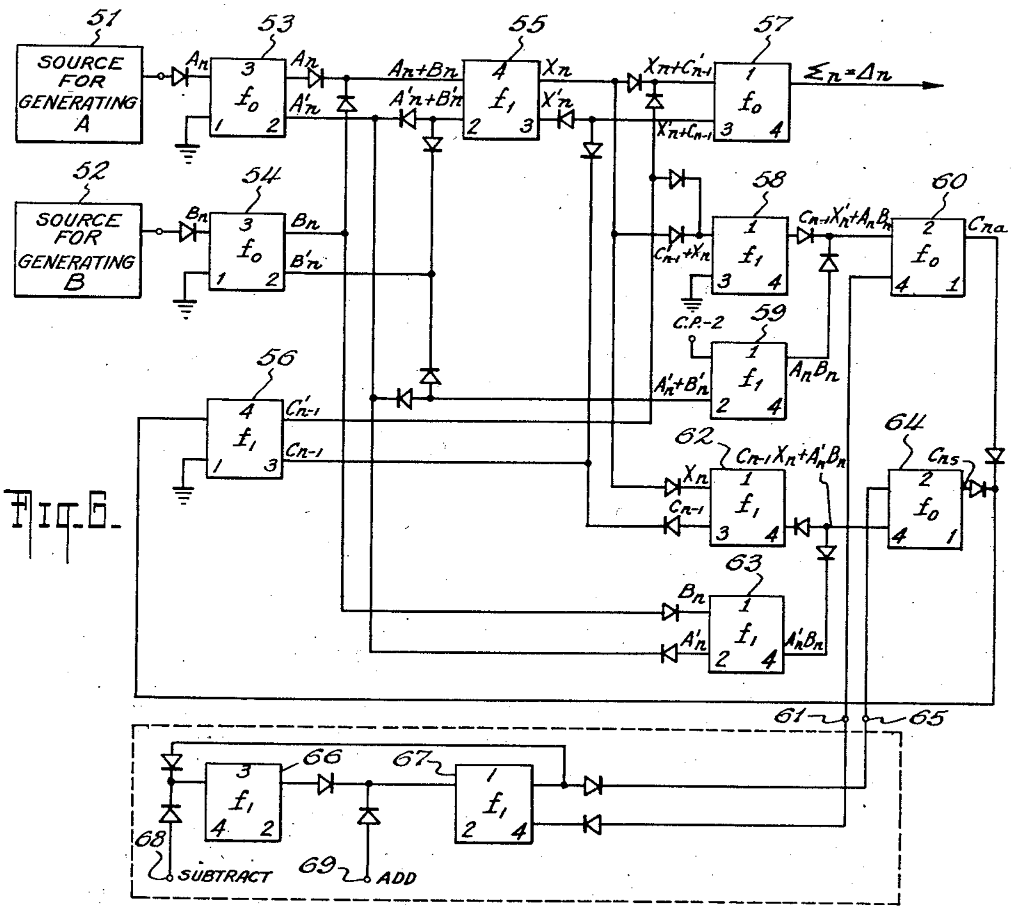
Fig. 6 is a circuit diagram of the preferred arithmetic computer circuit of this invention.

The arithmetic circuit of this invention as shown in detail in Fig. 6 is constructed by proper interconnection of a plurality of functor elements of the type described. In this figure the functor elements are shown as blocks having four terminals, the two terminals on the left of each block representing the input terminals ahd the two terminals on the right representing the output terminals. The upper output terminal is the current source terminal and the lower output terminal is the current sink terminal. This circuit is capable of arithmetically combining a pair of binary digital numbers A and B, both in the series mode, and each number being represented by a train of electrical pulses, wherein the presence of a pulse designates the binary one and the absence of a pulse designates the binary zero, and of delivering at an output terminal a single binary digital number in the series mode, represented by a train of electrical pulses, which differs from the number A by the number B. The circuit operates according to the principles formulated in Equations 5, 9 and 14.

Figure 7:
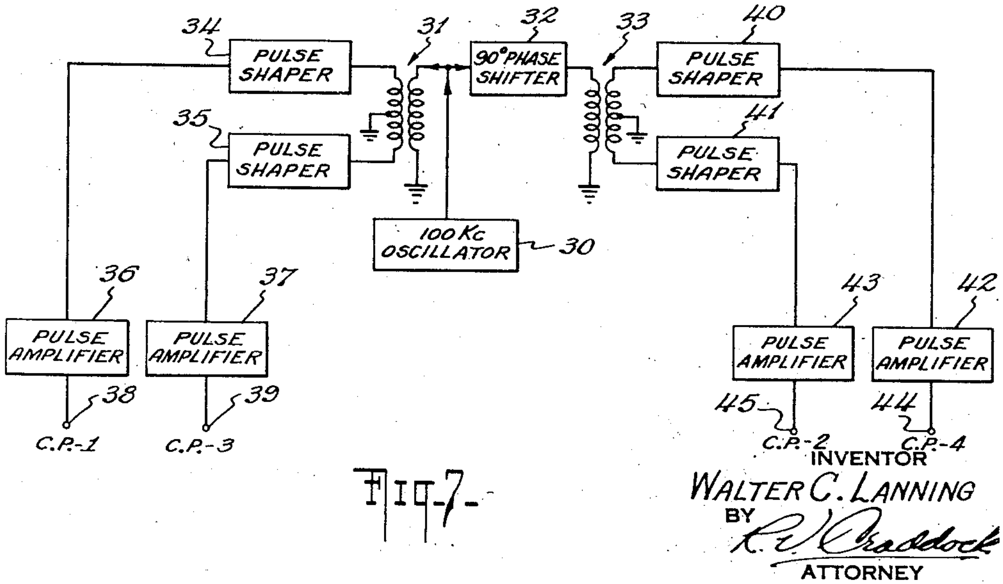
Fig. 7 is a circuit diagram of a clock source to be used in conjunction with the circuit of Fig. 6.

A clock source for delivering positive pulses to the reset, input, and output windings is shown in Fig. 7. The clock source delivers four clock pulses spaced 90° apart during one clock cycle, the clock cycles recurring at 100 kc. A 100 kc. oscillator 30 determines the recurrence frequency of the clock pulses. The output signal of oscillator 30 is split into two portions, one portion being applied to the primary winding of a transformer 31 and the other portion, after being delayed by 90° in phase shifter 32, being applied to the primary winding of a transformer 33. The secondary winding of transformer 31 is center tapped in order to provide two signals, one from each end of the secondary winding, 180° out of phase with each other. The two signals from the secondary winding of transformer 31 are passed through respective pulse shaper networks 34 and 35 and respective pulse amplifiers 36 and 37 to clock pulse terminals 38 and 39. The secondary winding of transformer 33 is center tapped in order to provide two signals, one from each end of the secondary winding, 180° out of phase with each other, and also 90° out of phase with respect to corresponding signals delivered by the secondary winding of transformer 31. The two signals from the secondary winding of transformer 33 are passed through respective pulse shaper networks 40 and 41 and respective amplifiers 42 and 43 to clock pulse terminals 44 and 45. Thus, the output of the clock source is a series of recurring positive pulses from each of four output terminals. The pulse recurrence frequency of the signal from each terminal is 100 kc. One pulse is delivered from each of the terminals during each cycle of oscillator 30. The clock pulses are delivered in cyclical order from terminals 38, 45, 39, and 44. Terminals 38, 45, 39 and 44 are respectively labeled CP–1, CP–2, CP–3, and CP–4 to indicate the cyclical order of the clock pulse available at that terminal.

Referring again to Fig. 6, in the block representing each functor, is a series of numerals representing clock pulse numbers. The numeral in the lower left corner indicates the number of the clock pulse which energizes the input windings of the functor. The numeral in the lower right corner indicates the number of the clock pulse which energizes the output windings of the functor. The numeral in the top center portion of the block indicates the number of the clock pulse which resets the functors.

In operation, a pair of electrical pulse trains representing respectively the binary digital numbers A and B, both in the series mode, are generated as shown in Fig. 6, in respective sources 51, 52, which may be preceding computer circuits. These pulse trains are applied to respective input terminals of functors 53 and 54. The particular digits entering the input terminals are designated $A_n$, $B_n$. The other input terminal of each of functor 53 and 54 is connected to ground, thereby providing a ready path through the input winding of each functor for all pulses which appear in the applied pulse trains. Functors 53 and 54 are each of the functor zero type so that the signals at each of their current source output terminals represent a Conjunctive operation on the input signals to each functor. Because of the ground connection, one of the input signals to each of functors 53 and 54 is always 1. Since the Conjunctive operation on any number and unity is that number, the signals from the current source output terminals of functors 53 and 54 will be respectively $A_n$, $B_n$. The signals from the current sink output terminals of functors 53 and 54 will be respectively the Not of $A_n$, $B_n$; that is $A_n'$, $B_n'$.

The current source output terminals of functors 53 and 54 are connected in parallel to one input terminal of a functor 55 which is of the functor one type. Thus, the signal to this terminal, as shown, is the mathematical operation $A_n$, Or $B_n$. The current sink output terminals of functors 53 and 54 are connected in parallel to the other input terminal of functor 55. The signal to this terminal is $A_n'$, Or $B_n'$.

Functor 55 being of the functor one type performs a Disjunctive operation on signals supplied to its input terminals. This Disjunctive operation is formulated in the following equation, $$[(A_n+B_n)(A_n'+B_n')] \quad (22)$$

which may be reduced to the following simplified expression, $$A_n'B_n'+A_nB_n=X_n \quad (23)$$

Equation 23 states that functor 55 yields a one out if the inputs are alike. This result is an Equivalence operation on the digits $A_n$, $B_n$, and is represented by the symbol $X_n$, so defined in Equation 4. This Equivalence operation yield is delivered at the current source output terminal of functor 55. The Not yield of this Equivalence operation is delivered at the current sink output terminal of functor 55. However, since the Not of an Equivalence operation is an Exclusive-Or operation, it is seen that both the Equivalence and Exclusive-Or operations on the numbers $A_n$, $B_n$ are available at the output terminals of functor 55.

Referring to the clock pulse numerals for functors 53, 54 and 55, if the output signals are read out of functors 53 and 54 and into functor 55 on clock pulse 2 the output of functor 55 may be read out on a succeeding clock pulse such as clock pulse 3.

The transfer term $C_{n-1}$ from the preceding digit operation has been stored in a functor 56, which is of the functor one type, and is available for use after the signals $A_n$, $B_n$ have been introduced into the system. The Not of the preceding transfer term is available at the current source output terminal of functor 56 and the preceding transfer term is available at the corresponding current sink output terminal. The current source output terminals of functors 55 and 56 are connected in parallel to one input terminal of functor 57, which is of the functor zero type, the input signal to that terminal being $X_n$ Or $C_{n-1}'$. The current sink output terminals of functors 55 and 56 are connected in parallel to the other input terminal of functor 57, the input signal to that terminal being $X_n'$ Or $C_{n-1}$. Functor 57 performs a Conjunctive operation on its two input signals, this operation being represented in the following expression, $$(X_n+C_{n-1}')(X_n'+C_{n-1}) \quad (24)$$

which may be simplified as follows:

$$C_{n-1}X_n+C_{n-1}'X_n'=\Sigma_n=\Delta_n \quad (25)$$

However, this equation is the same as Equation 5. Thus, the signal available at the current source output terminal of functor 57 is the desired signal, which represents a number which differs from A by B. In the case of addition this number is the sum term and is designated as $\Sigma_n$ and in the case of subtraction this number is the difference term and is designated as $\Delta_n$. Equation 25 is but a simplified expression for Equation 1, the latter equation expressing the relation that the output signal is a 1 if an odd number of its three input signals $A_n$, $B_n$ and $C_{n-1}$ represent unity.

In order to complete the desired arithmetical operation it is necessary to generate the transfer term for use on the digit combination of the terms of next higher significance. This is accomplished by interconnecting additional functors to perform the mathematical operations described in Equations 9 and 14.

A combination of three functors 58, 59 and 60 are interconnected with each other and with the circuit previously described in order to produce the transfer term for addition in accordance with Equation 9.

The current source output terminals of functors 55 and 56 are connected in parallel to one input terminal of functor 58 which is of the functor one type. The other input terminal of functor 58 is grounded. Since the input signal to functor 58 is $C_{n-1}'$ Or $X_n$ its output signal, which represents a Disjunctive operation on signals applied to the input terminals, is $C_{n-1}X_n'$. This signal is available at the current source output terminal of functor 58 and is the first term in the polynomial indicated in Equation 9.

The current sink output terminals of functors 53 and 54 are connected in parallel to one input terminal of functor 59 which is of the functor one type. The other input terminal to functor 59 is connected to the CP-2 terminal of the clock source. Therefore the input signal to functor 59, which is applied on clock pulse 2, is $A_n'$ Or $B_n'$. Functor 59 performs a Disjunctive operation on signals applied to its input terminals and therefore the output signal available at its current source terminal is $A_nB_n$.

The current source output terminals of functors 58 and 59 are connected in parallel to one input terminal of functor 60. Thus the signal input to this terminal of functor 60 is given by the following expression, $$C_{n-1}X_n'+A_nB_n=C_{na} \quad (26)$$

which is the desired transfer term for addition (the carry term). This transfer term for addition may be read into functor 60 only when a selecting signal representing unity is simultaneously applied to the other input terminal of functor 60. Under all other conditions the input to functor 60 will be a zero. Consequently the output of functor 60 will only represent the transfer term for addition when the input signal to said other input terminal is properly a one, else the output will be 0. The selecting signal coupled to said other input terminal of functor 60 is applied at terminal 61.

Functors 62, 63 and 64 are interconnected with each other and with the earlier described circuit to generate the transfer term for subtraction in accordance with Equation 14. The current source output terminal of functor 55 is connected to one input terminal of functor 62. The current sink output terminal of functor 56 is connected to the other input terminal of functor 62. Thus the input signal to functor 62 is $C_{n-1}X_n$. Since functor 62 is of the functor one type the signal available at its current sink output terminal is the same as its input signal, that is $C_{n-1}X_n$ and is the first term in the polynomial indicated in Equation 14. The current sink output terminal of functor 53 is connected to one input terminal of functor 63. The current source output terminal of functor 54 is connected to the other input terminal of functor 63. Consequently, the input signal to functor 63 is $A_n'B_n$. Since functor 63 is of the functor one type its output signal at the current sink terminal is the same as its input signal, that is $A_n'B_n$.

The current sink output terminals of functors 62 and 63 are connected in parallel to one input terminal of functor 64, the signal to that terminal being $$C_{n-1}X_n+A_n'B_n=C_{ns} \quad (27)$$

which is the desired transfer term for subtraction (the borrow term). This transfer term for subtraction may be read into functor 64 only when a selecting signal representing unity is simultaneously applied to the other input terminal of functor 64. Under all other conditions the input to functor 64 will be a zero. Consequently the output of functor 64 will only represent the transfer term for subtraction when the input signal to said other input terminal is properly a one, else the output will be 0. The selecting signal coupled to said other input terminal of functor 64 is applied at terminal 65.

A circuit to be described will apply a signal representing unity to one of terminals 61 and 65 and a signal representing zero to the other of these two terminals on clock pulse 4. The associated functor 60 or 64 which receives the unity signal or clock pulse 4 has read into it the corresponding transfer term. This transfer term will be read out on clock pulse 1 and fed into functor 56 which stores the transfer term for use at a later time when the circuit is operating on the digits $A_{n+1}$, $B_{n+1}$. Thus, depending on whether the transfer term is read back into functor 56 from functor 60 or functor 64, the circuit of this invention will perform the operation of addition or the operation of subtraction.

A circuit for supplying a binary 1 to one of the terminals 61, 65 and a binary zero to the other of these two terminals in order to selectively apply the output signals of functors 60 and 64 to the storage functor 56 is described in the copending U. S. patent application S. N. 521,690 by W. C. Lanning. This circuit is shown in the dotted box at the bottom of Fig. 6 and comprises the functor 66 and 67, both of the functor one type, properly interconnected and connected to terminals 61 and 65 for performing the desired selection operation. This circuit is capable of delivering continuously a particular binary digit in response to a proper control signal. If no trigger pulses are applied to either of the set terminals 68, 69 and the circuit is so operating that on clock pulse 4 a binary 0 is applied to the input terminal of functor 66, a binary 1 will be delivered from the output terminal of functor 66 and applied to the input terminal of functor 67 on clock pulse 2. In a similar manner, on the next clock pulse 4 a binary 0 will be read out of functor 67 and into functor 66. Under these conditions a binary 0 will be applied to terminal 65 from the current source output terminal of functor 67 and a binary 1 will be applied to terminal 61 from the current sink output terminal of functor 67. Under these conditions, the computing circuit is performing the operation of addition.

To convert the computer circuit to perform the operation of subtraction a trigger pulse is applied to set terminal 68 on clock pulse 4. This serves to read a binary 1 into functor 66 on this pulse and results in a binary 0 being read into functor 67 on clock pulse 2. A binary 1 is read out of functor 67 on clock pulse 4. In the absence of further trigger pulses to either terminal 68 or terminal 69 the circuit will now continually deliver a binary 1 from the current source output terminal of functor 67 and a binary 0 from the current sink output terminal of functor 67. The binary 1 is applied to terminal 65 and will cause the computer circuit to perform as a subtractor.

To cause the circuit to once again perform as an adder, a trigger pulse must be applied to terminal 69 on clock pulse 2. This will read a binary 1 into functor 67 and thus cause a binary 0 to be read out from its current source output terminal on clock pulse 4, thereby setting the computer circuit to the addition mode.

While the functor used and the interconnections described in reference to the circuit of Fig. 6 represents the preferred embodiment of this invention, many modifications may be made in the circuit without departing from the spirit of this invention. Thus, the functors 53 and 54 may be of the functor one type. In such case, if their current source output terminals are connected in parallel to one input terminal of functor 55 and their current sink output terminals are connected in parallel to the other input terminal of functor 55 the signals available at the output terminals of functor 55 would remain unchanged from those of Fig. 6. However, in order to generate the transfer term for addition, it would be necessary to connect the current source output terminals of functors 53 and 54 in parallel to one input terminal of functor 59 and the other input terminal of functor 59 to ground. In order to generate the transfer term for subtraction, it would be necessary to connect the current source output terminal of functor 53 to one input terminal of functor 63 and the current sink output terminal of functor 54 to the other input terminal of functor 53.

Functors 53 and 54 may also be unlike, that is, one of these may be a functor zero and the other a functor one. If the current source output terminals of functors 53 and 54 were connected in parallel to one input terminal of functor 55 and their current sink output terminal were connected in parallel to the other input terminal of functor 55, the Disjunctive operation on the input signals to functor 55 would represent an Exclusive-Or operation on $A_n$, $B_n$. Thus the signal available at the output terminals of functor 55 would represent Exclusive-Or and Equivalance operation on $A_n$, $B_n$ whether functor 55 is of the functor 0 or of the functor 1 type. In order to generate the transfer term for addition, the current source output terminal of functor 55 would have to be connected to one input terminal of functor 58 and the current sink output terminal of functor 56 to the other input terminal of functor 58. Functor 58 would then have to be of the functor zero type. The terminals of functors 53 and 54 which would respectively represent $A_n$, $B_n$ would have to be connected to the two input terminals of functor 59, which would also have to be of the functor zero type. To generate the transfer term for subtraction, the current source output terminals of functors 55 and 56 would have to be connected in parallel to one input terminal of functor 62 and the other input terminal of functor 62 connected to ground. Functor 62 would then have to be of the functor zero type. The two terminals of functors 53 and 54 which generate the $A_n$ and $B_n'$ signals would have to be connected in parallel to one input terminal of functor 63 and the other input terminal of functor 63 either connected to ground or to the CP-2 terminal of the clock source. Functor 63 would then have to be of the functor zero type.

In a similar manner, functors 56, 60, and 64 may be of either type since the particular transfer term may be selected at an appropriate output terminal of each element. Functor 57 may be of either type since the output term would be available at one of its two output terminals.

Since may changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. A digital computer circuit for selectively performing the arithmetic operations of addition and substraction in the series mode upon a first binary digital number by a second binary digital number, each of said numbers being represented by a respective train of discrete signal elements wherein the value of each digit in the number is represented by the presence or the absence of a pulse in the corresponding signal element denoting a one and a zero respectively, comprising first and second functors, said first signal train being applied to an input terminal of said first functor and said second signal train being applied to an input terminal of said second functor; a third functor, the current source output terminals of the first and second functors being connected in parallel to one input terminal of the third functor and the current sink output terminals of the first and second functors being connected in parallel to the other input terminal of the third functor, whereby the signals available at the output terminals of the third functor represent respectively Equivalence and Exclusive-Or operations on simultaneous digits of said first and second numbers; a fourth functor which stores a signal representing the transfer term of the immediately preceding digit operation; a fifth functor, the current source output terminals of the third and fourth functors being connected in parallel to one input terminal of the fifth functor and the current sink output terminals of the third and fourth functors being connected in parallel to the other input terminal of the fifth functor, whereby the signal available at one of the output terminals of the fifth functor represents the desired arithmetic operation; a sixth functor, one of the output terminals of each of the third and fourth functors being connected to the input terminals of the sixth functor, whereby the output signal of the sixth functor represents a Conjunctive operation on the transfer term of the fourth functor and the Exclusive-Or term of the third functor, a seventh functor, one of the output terminals of each of the first and second functors being connected to input terminals of the seventh functor, whereby the output signal of the seventh functor represents a Conjunctive operation on simultaneous digits of said first and second numbers; an eighth functor, corresponding output terminals of each of said sixth and seventh functors being coupled in parallel to one input terminal of said eighth functor; a ninth functor, one of the output terminals of each of the third and fourth functors being connected to input terminals of the ninth functor, whereby the output signal of the ninth functor represents a Conjunctive operation on the Equivalence output signal of the third functor and said transfer term; a tenth functor, one of the output terminals of each of the first and second functors being connected to the input terminals of the tenth functor, whereby the output signal of the tenth functor represents a Conjunctive operation on simultaneous digits of the Not of said first number and said second number; an eleventh functor, corresponding output terminals of each of said ninth and tenth functors being coupled in parallel to one input terminal of said eleventh functor, corresponding output terminals of each of said eighth and eleventh functors being connected in parallel to one input terminal of said fourth functor, means for selectively applying a series of unity digits to one of the other input terminals of said eighth and eleventh functors, whereby the transfer term stored for use in the arithmetic operation on the next higher significant digits of said first and second numbers represents the carry term for addition and the borrow term for subtraction.

2. A digital computer circuit for selectively performing the arithmetic operations of addition and subtraction in the series mode upon a first binary digital number by a second binary digital number, each of said numbers being represented by respective first and second trains of discrete signal elements, wherein the value of each digit in the number is represented by the presence or the absence of a pulse in the corresponding signal element denoting a one or a zero respectively, comprising a plurality of logical elements each adapted to receive two input signals representing respective binary digits at respective first and second input terminals, to store a signal representing a binary digit of one value when both of the input signals represent ones and a binary digit of the other value when any one of the input signals represents a zero, and subsequently to deliver output signals at respective first and second output terminals representing respectively the stored digit and the Not thereof; means for applying said first train to an input terminal of a first of said logical elements, means for applying said second train to an input terminal of a second of said logical elements, means for connecting the first output terminals of said first and second logical elements in parallel to one input terminal of a third of said logical elements, means for connecting the second output terminals of said first and second logical elements in parallel to the other input terminal of said third logical element, whereby the output signals available from the third logical element represent an Equivalence operation and the Not thereof on simultaneous digits of said first and second numbers, a fourth of said logical elements for storing a signal representing the transfer term of the immediately preceding digit operation; means for connecting the first output terminals of said third and fourth logical elements in parallel to one input terminal of a fifth of said logical elements, means for connecting the second output terminals of said third and fourth logical elements in parallel to the other input terminal of said fifth logical element, whereby the output signal of the fifth logical element represents the desired arithmetic operation; means for connecting one output terminal of each of said third and fourth logical elements to an input terminal of a sixth of said logical elements, whereby the signal available at one output terminal of the sixth logical element represents a Conjunctive operation on said transfer term and the Not of said Equivalence term; means for connecting one output terminal of each of said first and second logical elements to an input terminal of a seventh of said logical elements, whereby the signal available at one output terminal of the seventh logical element represents a Conjunctive operation on simultaneous digits of said first and second numbers; means for connecting said one output terminals of the sixth and seventh logical elements in parallel to one input terminal of an eighth of said logical elements; means for connecting one output terminal of each of said third and fourth logical elements to an input terminal of a ninth of said logical elements, whereby the signal available at one output terminal of the ninth logical element represents a Conjunctive operation on said transfer term and said Equivalence term; means for connecting one output terminal of each of said first and second logical elements to an input terminal of a tenth of said logical elements, whereby the signal available at one output terminal of the tenth logical element represents a Conjunctive operation on simultaneous digits of the Not of said first number and said second number; means for connecting said one output terminals of the ninth and tenth logical elements in parallel to one input terminal of an eleventh of said logical elements; means for connecting one output terminal of each of said eighth and eleventh logical elements in parallel to an input terminal of said fourth logical element; and means for selectively applying a series of unity digits to one of the other input terminals of said eighth and eleventh logical elements, whereby the transfer term stored for use in the arithmetic operation on the next higher significant digits of said first and second numbers represents the carry term for addition and the borrow term for subtraction.

References Cited in the file of this patent

FOREIGN PATENTS 1,035,312 France ---------------- Apr. 15, 1953